United States Patent [19]

Lin

[11] Patent Number: 5,267,919
[45] Date of Patent: Dec. 7, 1993

[54] MECHANIC DRIVE APPARATUS

[76] Inventor: Hung-Chung Lin, No., 8, Lane 255, Lai-Nan St., Yen-Cheng Dist., Kaohsiung City, Taiwan

[21] Appl. No.: 985,193

[22] Filed: Dec. 3, 1992

[51] Int. Cl.⁵ .............................................. F16H 15/08
[52] U.S. Cl. ........................................ 476/30; 476/5; 476/16; 476/35
[58] Field of Search .................. 476/5, 16, 18, 21, 27, 476/28, 29, 30, 35

[56] References Cited

U.S. PATENT DOCUMENTS 423,864  3/1890  Farmer, Jr. ..................... 476/30 X Primary Examiner—Leslie A. Braun
Assistant Examiner—William O. Trousdell
Attorney, Agent, or Firm—Banner, Birch, McKie & Beckett

[57] ABSTRACT

An infinitely variable-speed mechanic drive apparatus is capable of providing a positive non-slip drive and includes a support; a driving shaft mounted rotatably on the support; a driven gear mounted axially and rotatably on the driving shaft; an intermediate transmission member disposed in a transverse direction to and mounted rotatably on the driving shaft. The intermediate transmission member includes an intermediate shaft, a driving wheel mounted rotatably on and shiftable in an axial direction of the intermediate shaft, the driving wheel being in frictional contact with the support, a biasing member biasing the driving wheel towards the axis of the driving shaft, and a driven transmission shaft rotatable around an axis parallel to the longitudinal direction of the intermediate shaft. The driven transmission shaft has a worm member which meshes with the driven gear, and a first drive member transmitting the rotating force of the driving wheel to the driven transmission shaft. A linkage member has an end fixedly mounted on the driving shaft and a free end which engages the biasing member in such a manner that the intermediate transmission member will rotate with the driving shaft while the biasing member is urged by the shifting movement of the driving wheel in the axial direction as a result of centrifugal force.

4 Claims, 5 Drawing Sheets

MECHANIC DRIVE APPARATUS

BACKGROUND OF THE INVENTION

1. Field of the Invention

The present invention relates to a mechanic drive apparatus, and particularly relates to an infinitely variable-speed mechanic drive apparatus which is capable of providing a positive non-slip drive.

2. Description of the Related Art

It is known that in a lathe, the speed of rotation of the spindle, and therefore, the cutting speed of the tool can be controlled by using different types of drive mechanisms. Among them are a belt drive, a gear drive and a friction-drive mechanism. In the gear drive mechanism, a number of gears can be employed to provide a variety of speeds. Though the cutting speed of the tool can be controlled by suitable selection of the transmission ratio of the meshed gears in the gearbox, due to the fixed radius of the gears employed in the gearbox, no infinitely variable control over the transmission ratio can be obtained.

The friction-drive mechanism which can provide an infinitely variable control over the transmission ratio, might be a solution in case that a stepless control of the cutting speed of the tool is needed. However, in order to develop a sufficient frictional force at the point of contact to enable the friction wheels to transmit power, two friction wheels should be pressed together firmly. Otherwise, an undesirable large amount of slip will occur between the friction wheels. Another disadvantage in employing the friction-drive mechanism to control the speed of the tool is that in the lathe, a significant amount of torque is oftentimes necessary for revolving the spindle to effect the machining of a workpiece, and unlike the gear drive, the driving shaft that rotates with the driven small wheel cannot provide enough force to drive a loaded workpiece.

SUMMARY OF THE INVENTION

It is an object of this invention to provide an infinitely variable-speed mechanic drive apparatus which is capable of providing a positive non-slip drive.

It is another object of this invention to provide an infinitely variable-speed mechanic drive apparatus which can give out a relatively high torque to drive a heavy loaded work spindle.

Accordingly, an infinitely variable-speed mechanic drive apparatus is capable of providing a positive non-slip drive and comprises: a support; a driving shaft mounted rotatably on said driving shaft; a driving gear mounted axially and rotatably on said driving shaft; an intermediate transmission member disposed in a transverse direction to and mounted rotatably on said driving shaft; a linkage member having an end mounted fixedly on said driving shaft and a free end; and means for engaging said free end with said intermediate transmission member in a movable position.

The intermediate transmission member includes: an intermediate shaft disposed in a transverse direction to said driving shaft; a driving wheel mounted rotatably on and shiftable in an axial direction of said intermediate shaft, said driving wheel being in frictional contact with said support; means for biasing said driving wheel towards the axis of said driving shaft; a driven transmission shaft rotatable around an axis parallel to the longitudinal direction of said intermediate shaft, said driving transmission shaft having a worm segment at an end thereof to mesh with said driven gear; and a first drive member transmitting the rotating force of said driving wheel to said driven transmission shaft.

The free end of the linkage member engages said biasing means in the intermediate transmission member in such a manner that said intermediate transmission member will rotate with said driving shaft, while said biasing means is urged by the shifting movement of said driving wheel in the axial direction as a result of centrifugal force.

In accordance with one aspect of this invention, the first drive member is a belt drive member.

In accordance with another aspect of this invention, the free end of said linkage member has a keyway, and the engaging means includes a sleeve member disposed between said driving wheel and said biasing means, said sleeve member being biased to urge said driving wheel towards the axis of said driving shaft, the sleeve member including a key member to be inserted slidably in said keyway in order to accommodate a restricted movement in a radial direction.

In accordance with still another aspect of this invention, the belt drive member includes a pulley-shaped hub member attached fixedly to and rotatable with said driving wheel, and a pulley mounted splinedly on said driven transmission shaft so as to restrict the rotation of said pulley relative to said driven transmission shaft and so as to admit only the axial movement of said pulley along the axis of said driven transmission shaft, said pulley being coupled with said sleeve member to move therewith in an axial direction.

These and other objects will be more clear through a detailed description of a preferred embodiment with reference to the accompanying drawings, in which:

DETAILED DESCRIPTION OF THE PREFERRED EMBODIMENT

Figure 1:
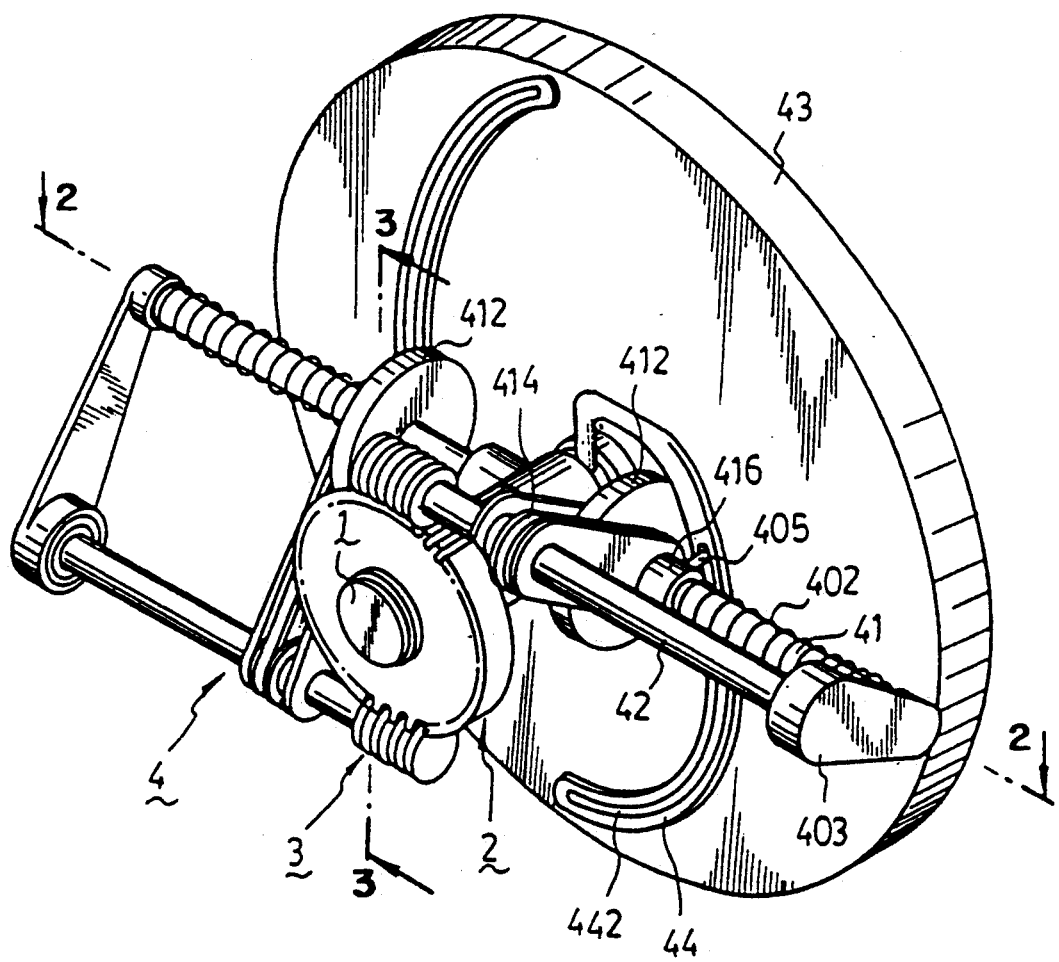
FIG. 1 shows a schematic perspective view of a mechanic drive apparatus in accordance with this invention.
Figure 2:
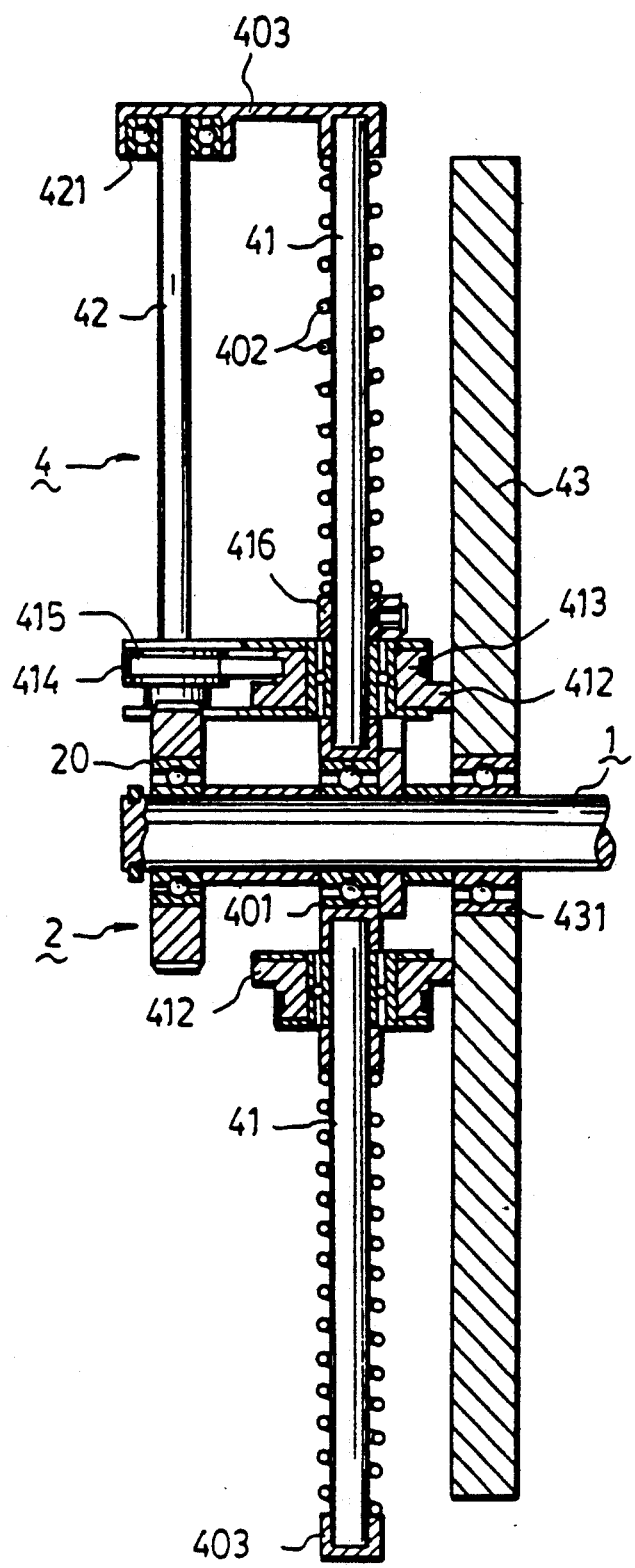
FIG. 2 is a section view taken along line I—I shown in FIG. 1.
Figure 3:
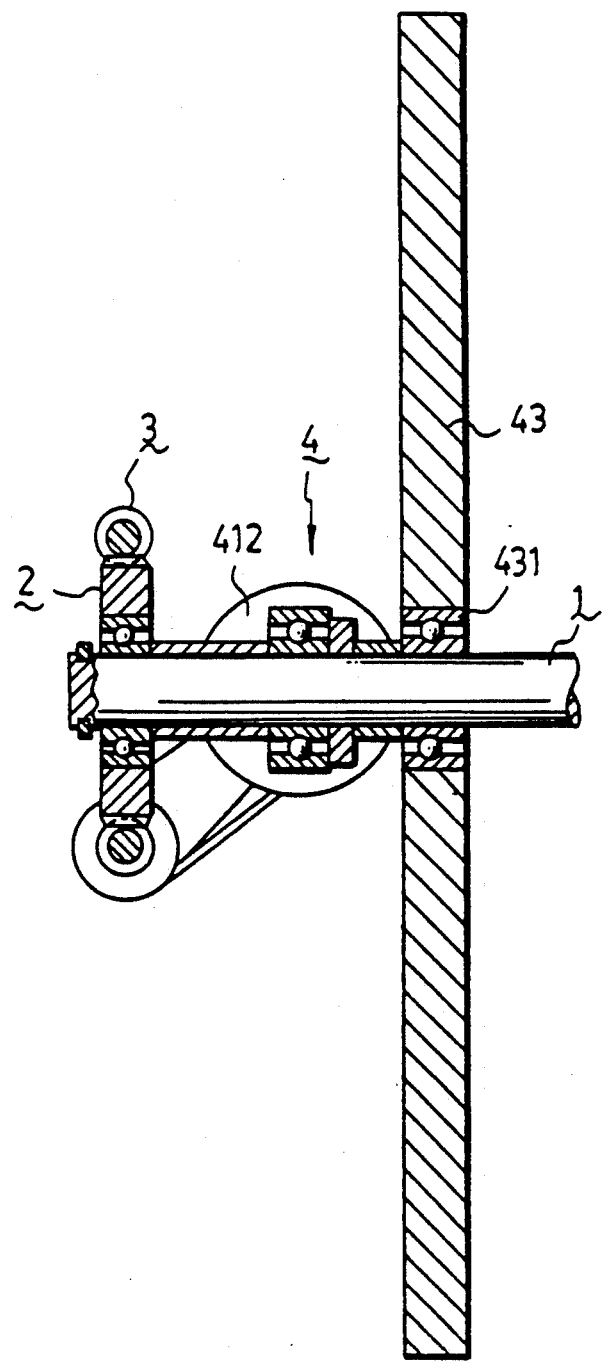
FIG. 3 is a section view taken along line II—II shown in FIG. 1.

Referring now to FIGS. 1-3, a mechanic drive apparatus is shown to include a disc-shaped support 43 for mounting rotatably a driving shaft 1 thereon. When the driving shaft 1 is rotated with the output shaft of an electric motor (not shown), the disc-shaped support 43 will remain still due to the interposition of a ball bearing 431 therebetween. A driven gear 2 is rotatably mounted on the driving shaft 1. By means of a ball bearing 20, the driven gear 2 will not rotate with the driving shaft 1. An intermediate transmission member 4 includes an intermediate shaft 41 and a driven transmission shaft 42 which has an end journalled on a bushing 421 that is disposed at an end of a connecting member 403. The other end of the driven transmission shaft 42 is provided with a worm segment 3 to mesh with the teeth of the driven gear 2. The intermediate shaft 41 is disposed in a transverse direction to and is rotatably mounted on the driving shaft 1. A ball bearing 401 is also interposed between an end of the intermediate shaft 41 and the driving shaft 1 so that no rotating force of the driving shaft 1 is transmitted directly to the intermediate shaft 41 through this junction.

A driving wheel 412, which is rotatably mounted on the intermediate shaft 41, has a pulley-shaped hub segment 413 to permit an endless flexible band 414 to pass therearound. A belt drive is constituted by tensioning the opposite portion of the endless flexible band 414 through a pulley member 415 which is mounted on the driven transmission shaft 42 by means of a spline (not shown) so as to restrict the rotation of the pulley member 415 relative to the driven transmission shaft 42, and so as to admit only the axial movement of the pulley member 415 along the axis of the driven transmission shaft 42. The pulley member 415 is coupled with a sleeve member 416 to move together in an axial direction. Any rotation of the driving wheel 412 will be transmitted via the belt drive to drive the worm segment 3 which, in turn, drives the driven gear 2 and then a spindle (not shown) of a lathe which is to be driven. The driven transmission shaft 42 will rotate freely around its longitudinal axis.

The other end of the intermediate shaft 41 is attached fixedly to the other end of the connecting member 403. On the lateral side of the driving wheel 412 opposite to the side at which the hub segment is located, the sleeve member 416 is disposed and biased by a biasing means, such as a coil spring 402, so as to urge the driving wheel 412 towards the axis of the driving shaft 1. The sleeve member 416 is coupled with the pulley member 415 so as to carry the pulley member 415 to slide along the longitudinal axis of the driven transmission shaft 4. The sleeve member 416 is provided with a key 405 which is inserted in a keyway 442 that is disposed in and that extends to the free end of a linkage member 44. The other end of the linkage member 44 is attached fixedly to the lower part of the driving shaft 1 so that the linkage member 44 will rotate with the driving shaft 1. The keyway 442 is shaped so that the rotation of the linkage member 44, which is driven by the driving shaft 1, will impart a rotational force to the intermediate shaft 41 while accommodating the shifting movement of the driving wheel 412 in the axial direction that is induced by centrifugal force.

The circular rim of the driving wheel 412 is in frictional contact with the support 43. Therefore, any rotation of the intermediate shaft 41 will cause the rotation of the driving wheel 412.

It should be noted that in order for the intermediate transmission member 4 to be rotated stably and smoothly around the axis of the driving shaft 1, another half, which is identical in shape to the intermediate transmission member 4, is provided transversely at the opposite side of the driving shaft 1 in order to keep rotary parts of the invention in a more balanced position.

Figure 4:
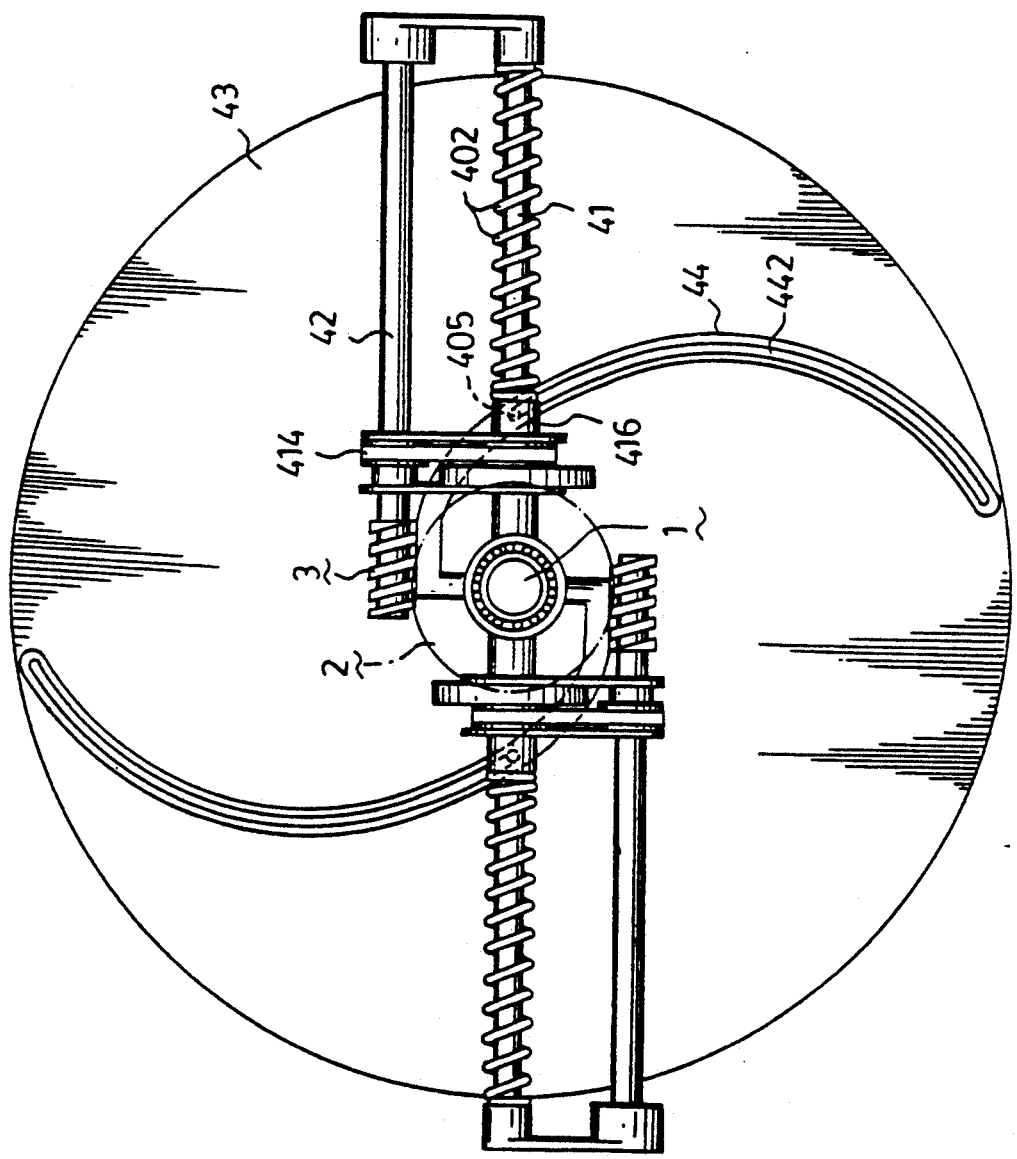
FIGS. 4 and 5 are schematic views illustrating two different positions of the driving wheel when the mechanic drive apparatus is in operation.
Figure 5:
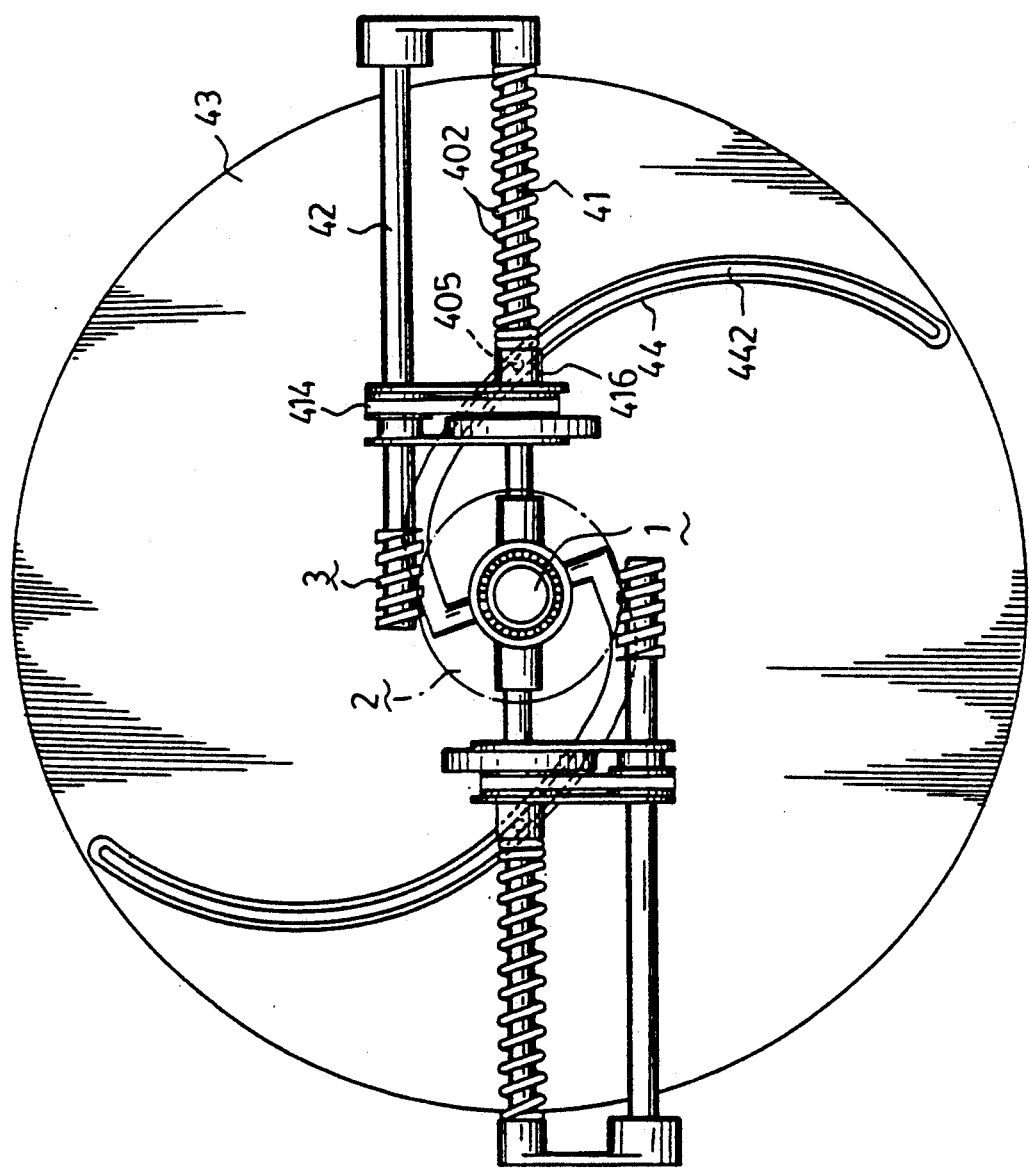

Now referring to FIGS. 4 and 5, both of which illustrate the operational states of the mechanic drive apparatus in accordance with this invention, when the driving shaft 1 is driven by an electric motor (not shown), the rotational force of the shaft will be transmitted to the intermediate shaft 41 through the key and keyway engagement 405, 442. The different magnitude of the centrifugal force that is generated during the different speed of rotation of the intermediate shaft 41 determines the distance between the axis of the driving shaft 1 and the driving wheel 412. The resulting centrifugal force will cause the driving wheel 412, as well as the sleeve member 416, to shift away from the axis of the driving wheel 1 until the centrifugal force match the biasing force of the coil spring 41. Since the rotational speed of the driving wheel can be varied as desired without any limitation by simply varying the rotational speed of the driving shaft 1, the infinitely variable-speed control of the driven gear 2 can be achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What I claim is:

1. An infinitely variable-speed mechanic drive apparatus which is capable of providing a positive non-slip drive and which comprises:

a support;

a driving shaft mounted rotatably on said support;

a driven gear mounted axially and rotatably on said driving shaft;

an intermediate transmission member disposed in a transverse direction to and mounted rotatably on said driving shaft, said intermediate transmission member including:

an intermediate shaft disposed in a transverse direction to said driving shaft, a driving wheel mounted rotatably on and shiftable in an axial direction of said intermediate shaft, said driving wheel being in frictional contact with said support, means for biasing said driving wheel towards the axis of said driving shaft, a driven transmission shaft rotatable around an axis parallel to the longitudinal direction of said intermediate shaft, said driven transmission shaft having a worm member at an end thereof to mesh with said driven gear, and a first drive member transmitting the rotating force of said driving wheel to said driven transmission shaft;

a linkage member having an end mounted fixedly on said driving shaft and a free end; and means for engaging said free end with said biasing means in such a manner that said intermediate transmission member will rotate with said driving shaft while said biasing means is urged by the shifting movement of said driving wheel in the axial direction as a result of centrifugal force.

2. An infinitely variable-speed mechanic drive apparatus according to claim 1, wherein said first drive member is a belt drive member.

3. An infinitely variable-speed mechanic drive apparatus according to claim 2, wherein said free end of said linkage member has a keyway, and said engaging means includes a sleeve member disposed between said driving wheel and said biasing means, said sleeve member being biased to urge said driving wheel towards the axis of said driving shaft, said sleeve member including a key member inserted slidably in said keyway in order to accommodate a restricted movement in a radial direction.

4. An infinitely variable-speed mechanic drive apparatus according to claim 3, wherein said belt drive member includes a pulley-shaped hub member attached fixedly to and rotatable with said driving wheel, and a pulley mounted splinedly on said driven transmission shaft so as to restrict the rotation of said pulley relative to said driven transmission shaft, and so as to admit only the axial movement of said pulley along the axis of said driven transmission shaft, said pulley being coupled with said sleeve member so as to move therewith in an axial direction.

* * * * *